United States Patent [19]

Sakurada et al.

[11] 4,075,075

[45] Feb. 21, 1978

[54] PROCESS FOR PREPARING NOVEL SYNTHETIC FIBERS

[75] Inventors: Ichiro Sakurada, Kyoto; Toshio Okada, Kadoma; Yutaka Hirano, Kurashiki, all of Japan

[73] Assignee: Japan Atomic Energy Research Institute, Tokyo, Japan

[21] Appl. No.: 480,414

[22] Filed: June 18, 1974

Related U.S. Application Data

[63] Continuation of Ser. No. 135,451, April 19, 1971, abandoned.

Foreign Application Priority Data

Apr. 22, 1970 Japan .................................. 45-33798
Apr. 22, 1970 Japan .................................. 45-33799

[51] Int. Cl.² .............................................. C08F 8/00
[52] U.S. Cl. ..................... 204/159.17; 260/33.6 UA; 260/876 R; 260/884; 264/182
[58] Field of Search ............................ 264/182, 184; 260/876 R, 881, 884, 33.6 UA; 204/159.17

[56] References Cited

U.S. PATENT DOCUMENTS

| 3,081,242 | 3/1963 | Smith et al. | 204/154 |
| 3,124,629 | 3/1964 | Knudsen | 264/182 |
| 3,133,135 | 5/1964 | Ogle | 264/182 |
| 3,188,165 | 6/1965 | Magat et al. | 8/115.5 |
| 3,433,724 | 7/1969 | Chapiro et al. | 204/159.17 |

FOREIGN PATENT DOCUMENTS

| 38-6644 | 5/1963 | Japan | 260/881 |
| 45-1624 | 1/1970 | Japan | 260/881 |

*Primary Examiner*—Jay H. Woo
*Attorney, Agent, or Firm*—Stevens, Davis, Miller & Mosher

[57] ABSTRACT

Novel antiflaming fibers having excellent dyeability and heat resistance are prepared from a matrix-polymerized resin which comprises polymerizing acrylonitrile in the matrix of a vinyl chloride resin. A vinyl chloride resin and/or an acrylonitrile resin can be added in a specific amount to the matrix-polymerized resin when dissolved in a spinning solvent. Substantially the same fibers are also prepared from blended polymers which comprise blending a specific vinyl chloride resin and a specific acrylonitrile resin in the specific proportion, by employing the coagulation bath of an aqueous solution of calcium chloride.

6 Claims, No Drawings

PROCESS FOR PREPARING NOVEL SYNTHETIC FIBERS

This is a continuation of application Ser. No. 135,451, filed Apr. 19, 1971, now abandoned.

BACKGROUND OF THE INVENTION

1. Field of the Invention

This invention relates to a process for preparing novel synthetic fibers which are non-flammable and have excellent dyeability, heat resistance and mechanical properties. Particularly, it relates to a process for preparing novel synthetic fibers which comprise a vinyl chloride resin component and an acrylonitrile resin component, by way of matrix polymerization and/or blending.

2. Description of the Prior Art

Poly(vinyl chloride) fibers are widely employed for commercial uses because of their low-cost and excellent properties for the synthetic fibers. However, the PVC fibers can not be used in the presence of heat or in hot water, since the fibers are poor in resistance to heat and hot water. The acrylic fibers are consumed in a large quantity owing to their desirable properties such as excellent dyeability, feeling similar to wool and higher bulkiness. The cost of acrylic fibers is rather high in comparison with PVC fibers, and, furthermore, acrylic fibers are poor in antiflaming property.

Although PVC fibers are the synthetic fibers of low cost which have many valuable properties, and the flame-resistance thereof is unique among many synthetic fibers, they have a serious defect in that they begin thermal shrinkage even at 80° – 100° C. In order to eliminate this defect, the following treatments have been tried.

(i) A method of grafting acrylonitrile on PVC fibers: The percent graft of acrylonitrile must be as much as 100% based on the weight of PVC fibers for increasing the resistance to heat. In this method, their tenacity per denier decreases, since the grafted acrylonitrile polymer contributes little to their strength but increases their weight.

(ii) A method of copolymerizing vinyl chloride and acrylonitrile: No satisfactory heat-resistant fibers have so far been obtained, when compared with nylon, polyester, acrylics, vinylon and the like.

(iii) A method of blending PVC and another polymer resistant to heat: By this method, it is very difficult to obtain a completely homogeneous blend of two species of polymers. For example, some binary mixtures of polymers will dissolve in a common solvent through intense agitation and may appear to be a homogeneous solution. However, such a solution generally separates into two phases when the solution is left to stand for a long period of time.

SUMMARY OF THE INVENTION

The present inventors have succeeded in a process for preparing novel PVC-containing synthetic fibers which are non-inflammable and have excellent dyeability, mechanical property and resistance to heat and hot water.

An object of this invention is to provide a process for preparing the novel synthetic fibers by way of matrix polymerization. Said process comprises matrix-polymerizing in a degree not less than about 23% by weight of the matrix-polymerized resin, in a vinyl chloride resin powder, acrylonitrile or a mixture the major part of which is acrylonitrile and the minor part of which is a copolymerizable monomer; separating solid component after the polymerization; dissolving the resultant polymer in a solvent to prepare a spinning dope; and spinning the resultant dope. When the matrix-polymer is dissolved in a suitable solvent in advance of spinning, the matrix-polymer can, if desired, be incorporated with a vinyl chloride resin in such an amount that the matrix-polymerized acrylonitrile component is not less than about 23% by weight of the blended polymers, and/or with an acrylonitrile resin in such an amount that the resin is not more than about three times by weight of the matrix-polymerized acrylonitrile component.

Another object of this invention is to provide a process for preparing the novel synthetic fibers by way of blending. Said process comprises dissolving about 70 – about 30 parts by weight of a vinyl chloride resin having average degree of polymerization of about 800 – 2,000 and about 30 – about 70 parts by weight of an acrylonitrile resin having average degree of polymerization of about 1.5 – 5 (preferably 2 – 4) times that of the vinyl chloride resin, in a suitable solvent such as dimethyl formamide or dimethyl acetamide; and then spinning the resultant polymer solution into an aqueous solution of calcium chloride.

The vinyl chloride resin to be employed in this invention includes a homopolymer of vinyl chloride and a copolymer of more than about 50% by weight of vinyl chloride and a copolymerizable vinyl monomer or monomers such as a vinyl ester (e.g. vinyl acetate, vinyl stearate), a vinyl ether, vinylidene chloride and acrylonitrile. The acrylonitrile resin to be employed in this invention includes a homopolymer of acrylonitrile and a copolymer of more than about 75% by weight of acrylonitrile and a copolymerizable monomer or monomers such as styrene sulfonic acid, allyl sulfonic acid, a salt thereof; acrylic acid, methacrylic acid, itaconic acid, a salt thereof, a derivative thereof; a vinyl pyridine (e.g. 4-vinyl pyridine, 2-methyl-5-vinyl-pyridine, 5-ethyl-2-vinyl-pyridine); and styrene, methyl acrylate, methyl methacrylate, vinyl acetate etc. The same copolymerizable monomer or monomers can be applied to the matrix copolymerization in this invention in combination with more than about 75% by weight of acrylonitrile.

DESCRIPTION OF THE PREFERRED EMBODIMENTS

The preferred modes of practice of this invention are given below:

(1) A process by way of matrix polymerization: Upon the matrix polymerization, it is preferable to add to the polymerization system a liquid medium having the small swelling or solvent function, particularly a liquid hydrocarbon, with respect to a vinyl chloride resin and a resultant acrylonitrile matrix-polymer, in order to keep the vinyl chloride resin powder in the powder form in the course of matrix polymerization, for convenience of filtration, rinsing and dissolution. If desired, a chain transfer agent such as carbon tetrachloride, carbon tetrabromide or butanol can be added to the polymerization system in order to regulate the degree of polymerization of the resultant acrylonitrile matrix-polymer. The matrix polymerization can conveniently be carried out by way of insource polymerization employing an ionizing radiation; it can also be effected by heating the polymerization system in which a polymerization catalyst such as a radical initiator was impregnated in a vinyl chloride resin.

In general, most polymer solutions which are immiscible in each other tend to separate into distinct phases, even when a common solvent to each component polymer is employed, whereas, a vinyl chloride resin and an acrylonitrile resin matrix-polymerized therein of this invention homogeneously dissolve in an organic solvent for spinning such as dimethyl formamide and dimethyl acetamide without phase separation and can be spun into fibers.

In the case of the matrix polymerization, acrylonitrile or a mixture of acrylonitrile and another copolymerizable monomer is polymerized in the matrix of a vinyl chloride resin powder and the major part of the resultant acrylonitrile resin is formed without chemical bonding but in close contact with and by entangling with the molecules of the vinyl chloride resin, although a small amount of acrylonitrile may be graft-polymerized to the vinyl chloride resin. The acrylonitrile resin which may be formed outside the matrix of the vinyl chloride resin causes no problem in spinning, and the matrix-polymerized resin containing non-matrix-polymerized product can be used without removal thereof. Furthermore, some graft polymers may be formed in the matrix of the vinyl chloride resin. The graft polymer which is formed inside of the matrix in close contact with and in entanglement with the molecule chains in the matrix is considered to play the role of providing a homogeneous and stable solution of the resins.

It is suitable to employ a powder-form vinyl chloride resin prepared by a conventional emulsion or suspension polymerization without a heat-drying treatment thereafter. The particle size of the resin powder is preferred to be smaller, unless it is inconvenient to filtrate or centrifuge the resin powder after the polymerization.

The matrix polymerization of acrylonitrile or a mixture thereof by means of an ionizing radiation is preferably carried out in the absence of oxygen; however, it can be done in air. There are no special restrictions on the polymerization temperature; the polymerization is conveniently carried out at room temperature. Suitable ionizing radiation includes gamma rays and electron beam as well as alpha rays, beta rays, heavy particle beam and mixtures thereof. The dose to be employed is generally $10^3 - 10^8$ roentgen, preferably $10^4 - 10^5$ roentgen. Especially in the case of the radiation polymerization, it is preferable to carry out polymerization by adding a large quantity of a liquid hydrocarbon to a mixture of acrylonitrile and water, in order to prevent formation of non-matrix polymer outside of the vinyl chloride resin and to effect homogeneous agitation. An example of such embodiment comprises 100 g vinyl chloride resin, 200 ml acrylonitrile, 200 ml petroleum benzene and 500 ml water.

In the case of matrix polymerization by means of a radical catalyst, the vinyl chloride resin is impregnated in advance with an organic initiator such as benzoyl peroxide or azobisisobutyronitrile dissolved in a nonpolar solvent such as liquid hydrocarbons, so that the polymerization may essentially take place in the matrix of the resin. The catalystic polymerization is generally carried out at a temperature preferably ranging from about 40° to about 80° C. In the matrix polymerization, acrylonitrile or a mixture of acrylonitrile and another copolymerizable monomer is employed without a polymerization medium; or a mixture thereof with water can be used, adding, if desired, an emulsifier, since only a small amount of non-matrix polymer is formed outside of the vinyl chloride resin. However, satisfactory results can also be obtained by employing a mixture of acrylonitrile, water and a liquid hydrocarbon.

The concentration of spinning dope employed in this mode of practice is the same as is used in the ordinary wet or dry spinnings, and generally ranges from about 10% to about 80% by weight. Either wet spinning or dry spinning can be employed in this invention. For example, a matrix-polymerized resin powder according to this invention is dissolved in dimethyl formamide or dimethyl acetamide. The solution is, after filtration and defoaming, extruded into an aqueous solvent or other coagulation bath through a suitable spinning nozzle. The resulting filaments are stretched to about 1.5 – 2 times their starting length at a temperature ranging from room temperature to about 50° C, and then to about 2 – 6 times their first-stretched length at a temperature of about 80° – 100° C. If desired, the filaments are further treated for stabilization by heat setting with steam or any other suitable means.

When a vinyl chloride resin and/or an acrylonitrile resin are added to the matrix-polymerized resin, it is important that the acrylonitrile component matrix-polymerized be not less than 23% by weight of the blended polymers and/or the acrylonitrile resin be not more than three times by weight of the acrylonitrile component matrix-polymerized. If too much vinyl chloric resin is added to make the acrylonitrile component less than 23%, the resultant fibers do not have sufficient resistance to heat or hot water. If too much acrylonitrile resin is added, the resultant fibers become flammable. Furthermore, when the amount of resin or resins added exceeds the above limit, the stability of the resultant spinning dope is lowered, and it tends to separate into heterogeneous phases.

The fibers obtained in this mode of practice have a feeling similar to wool, excellent dyeability, high bulkiness and mechanical property, high resistance to heat and hot water, and high resistance to fibrillation, and also are excellent in transparency and antiflaming property.

(2) A process by way of blending: A vinyl chloride resin, which is generally obtained by means of a conventional emulsion or suspension polymerization process, having average degree of polymerization of about 800 – about 2,000 is employed in this mode of practice. An acrylonitrile resin having average degree of polymerization of about 1.5 – 5 times, preferably 2 – 4 times that of the vinyl chloride resin can also be employed. When the average degrees of polymerization of these resins are outside of the above ranges, the miscibility of the vinyl chloride resin and the acrylonitrile resin in a solvent such as dimethyl formamide and dimethyl acetamide becomes incomplete. The solution lacks flowability and contains some amount of gelled material, and gradually separates into two phases.

The acrylonitrile resin is prepared by an ordinary process such as mass polymerization, solution polymerization, emulsion polymerization, and aqueous precipitation polymerization. For example, a suitable acrylonitrile resin for the purpose of this invention is prepared by polymerizing by means of an ionizing radiation acrylonitrile or a mixture thereof with a copolymerizable monomer in an aqueous ligroin medium in the presence of n-butanol as a polymerization-degree regulator.

The polymer blend according to this invention dissolves homogeneously in a solvent such as dimethyl formamide and dimethyl acetamide and provides a translucent and viscous solution which is easily spinnable and very stable for a long period of time. The concentration of the spinning dope employed in this mode of practice is substantially the same as those employed in an ordinary wet spinning process. It is preferable to employ a concentration of about 10% - about 30% by weight and preferably the concentration should be controlled so as to maintain the viscosity of the dope within about 150 - about 500 poises. The spinning dope is, after filtration and defoaming, extruded into an aqueous solution of calcium chloride through a suitable nozzle. The temperature of the coagulation bath can be determined according to the coagulation state of the filaments by those skilled in the art, but a bath heated at about 60° - 110° C is generally employed. The heated coagulation bath is considered to be useful for controlling the rate of desolvation from the solvent-containing gel filaments and for preventing the micro-structual separation of the two species of polymers in the course of the filament formation.

After the coagulation, the filaments can be treated with water bath, steam bath, an aqueous solvent bath or other heating means in order to give the molecular orientation by thermal stretching, and then the heat treatment under stretched, non-stretched or contracted state is effected on the stretched filaments in order to remove strains in the filaments and to give them the thermally stable structure.

The state of mixing of two species of polymers in a filament is observed from the microphotograph of the cross section of the filament, but it is more readily observed by magnifying the broken end shape of the filament which was broken by way of stretching. When two species of polymer are insufficiently mixed, a filament separates into many fibrils in the vicinity of the break point. The filament obtained by this invention exhibits no fibrillation at the break point; the filament keeps its shape.

When the vinyl chloride resin content is less than 30% by weight, the resulting fibers become inflammable. If the acrylonitrile resin content is less than 30% by weight, the resulting fibers do not exhibit sufficient resistance to heat.

The fibers obtained in this mode of practice have excellent properties particularly in dyeability, bulkiness, mechanical property, non-fibrillation property and anti-flaming property, and satisfactory whiteness degree. The fibers are suitable for clothes, wadding, curtain and carpeting and the like.

(3) Examples: In order to explain this invention further, some preferred embodiments of this invention are shown below. However, these examples are given only for the better understanding, and it should be noted that changes and modifications can be effected within the spirit and scope of this invention.

Incidentally, the average degree of polymerization was calculated in the following manner.

Vinyl chloride resin;

Dissolve the resin in tetrahydrofurane, measure at 25° C the intrinsic viscosity $[\eta] = dl/g$, and calculate degree of polymerization P with the formula, $[\eta] = 1.85 \log(1 + P/500)$.

Acrylonitrile resin;

Dissolve the resin in dimethyl formamide, measure at 25° C the intrinsic viscosity $[\eta] = dl/g$, take, as degree of polymerization, one fifty-third of the molecular weight M calculated with the formula, $[\eta] = 3.96 \times 10^{-4} M^{0.75}$.

EXAMPLE 1

In a three-necked flask with stirrer, was put 98.5 g poly(vinyl chloride) powder (product of suspension polymerization, degree of polymerization 970, average particle size (120 $\mu$), and were added thereto 200 ml acrylonitrile, 200 ml ligroin and 25 g n-butanol. After allowing them to stand overnight, 500 ml of water was added thereto. The mixture was subjected to gamma rays at the dose rate of $8.3 \times 10^3$ γ/hr for 5.5 hours at room temperature, while the mixture was suspended by stirring and passing nitrogen gas. The reaction product was poured into methanol, filtered with glass filter, washed with methanol so as to sufficiently remove unreacted acrylonitrile, ligroin and n-butanol, and dried at 50° C. The resulting matrix-polymerized resin contains 48% by weight of acrylonitrile component which was determined according to the increase in weight. The resulting resin easily dissolved in dimethylformamide and exhibited intrinsic viscosity number 1.94 dl/g at 30° C.

The resultant resin was dissolved in dimethylformamide to prepare 18% by weight solution. The solution was coagulated in 50° C bath of aqueous solution containing 50% by weight of dimethylformamide by extruding it through the spinning nozzle 0.08 mm orifice in diameter. The coagulated filament was stretched to 2 times length in 50° C water, further to 3.3 times length in boiling water, and then stabilized in boiling water at the relaxed condition. The fibers obtained have excellent dyeability with Diacelliton fast blue BFI (disperse dye supplied by Mitsubishi Chemical Industrial Company, Japan). As shown in Table 1, the fibers were remarkably improved in resistance to heat and hot water in comparison with the product of reference example 1.

REFERENCE EXAMPLE 1

Poly(vinyl chloride) as employed in Example 1 was dissolved in dimethylformamide to make the concentration 20% by weight. The solution was coagulated in the same spinning condition as in Example 1, and the resultant filament was stretched to 3.5 times length in 98° C water. The stabilization treatment was omitted in this example, since this filament remarkably shrinks by treating it in boiling water at the relaxed condition. The test results of the fibers thus obtained are also shown in Table 1.

Table 1

| | Tenacity (g/d) | Elongation (%) | Knot strength ratio(%) | Young's modulus (g/d) | Water[i] resistance(%) | Heat[ii] resistance(° C) |
|---|---|---|---|---|---|---|
| Exp. 1 | 2.75 | 33 | 107 | 44 | 6 | 180 |
| Ref. Exp. 1 | 2.92 | 31 | 101 | 50 | 45 | 121 |

[i] Shrinkage ratio in 110° C water.
[ii] Dry heating temperature at which the filaments thermally shrink by 10%.

EXAMPLE 2

A three-necked flask was charged with 100 g poly(vinyl chloride) (the same one as employed in Example 1), and thereto were added 160 ml acrylonitrile, 1.8 g potassium p-styrenesulfonate, 160 ml ligroin and 50 g n-butanol. After stirring the mixture overnight, 500 ml water was added thereto. The atmosphere in the flask was replaced with nitrogen by passing nitrogen gas with agitation, and the mixture was irradiated with gamma rays at the dose rate of 8.3 × 10³ γ/hr at 30° C, while the poly(vinyl chloride) resin was kept suspended. After the irradiation of 5 × 10⁵γ, the reaction product was filtered with glass filter, washed with methanol so as to sufficiently remove unreacted acrylonitrile, ligroin and n-butanol, and then dried at 50° C under reduced vacuum. The resulting polymer after drying weighed 201 g, and content of matrix-polymerized component was 50.2%. The amount of potassium p-styrenesulfonate in the matrix-polymerized chains was 1.3 mol% according to analysis of sulfur content.

The resulting polymer was dissolved in dimethylformamide at 70° C to obtain the spinning dope of 17.5% concentration. The solution was allowed to stand for a week, and it kept pale yellow, transparent and homogeneous state without phase separation. The spinning dope was extruded and coagulated in the aqueous solution containing 37.5% calcium chloride at 100° C though the spinning nozzle as employed in Example 1, stretched to 7.0 times length in 9.5° C water, dried, and then heat-treated at nontension condition in a 105° C steam bath, followed by oil finishing so as to give the filaments flexibility, bindability and antistatic property and by winding at the velocity of 60 meters/min. The wound filaments, after being allowed to stand and dry at room temperature, were subjected to various testings.

The fibers thus obtained have soft feeling similar to wool, fineness of 3 deniers, dry tenacity of 2.2 g/d, dry elongation of 40%, wet tenacity/standard tenacity ratio of 95% and Young's modulus of 28 g/d. The fibers gave the thermal shrinkages of 0.5% in 100° C water and of 7% in 115° C water, and the thermal shrinkage less than 10% in air at 230° C, which prove that the fibers are very excellent in thermal stability.

The comparison between the fibers of this invention and the commercial acrylic fibers was made with respect to antiflaming property. The ignition temperature of the well-opened fibers was determined in a heating oven wherein the temperature was raised at the rate of 50° C/min. The commercial acrylic fibers ignited at about 450° C, whereas the fibers obtained in this invention ignited at 500° C. There observed difference of about 50° C in the spontaneous ignition points between these fibers. When these fibers were set fire with match, the commercial acrylic fibers continued self-burning after they once caught fire. The fibers of this invention burned weakly when subjected to the flame, but exhibited self-extinguishing property to cease burning outside of the flame.

The fibers of this invention were dyed with basic dyestuff to give brilliant, attractive and deep dyeing and to exhibit the practicable fastness to sunlight as shown in Table 2.

Table 2

|  | Sevron Brilliant Red B | Astrazone Orange RRL |
| --- | --- | --- |
| Concentration | 2% owf | 2% owf |
| bath ratio | 50 : 1 | 50 : 1 |
| Temp./time | 98° C/2 hrs. | 98° C/2 hrs. |
| Pick-up | 19.8 mg/g | 18.7 mg/g |
| K/S | 11.5 | 13.3 |
| Fastness to light | Grade 3 –4 | Grade 5 |

REFERENCE EXAMPLE 2

The fibers obtained in Reference example 1 were dyed with the same dyestuff as employed in Example 2. The fibers were slightly colored and no dyeability was observed.

EXAMPLE 3

One hundred parts of the matrix-polymerized resin prepared in Example 2 was blended with 50 parts of poly (vinyl chloride) powder to obtain a polymer composition having an acrylonitrile content of 33.4%. This polymer composition was dissolved in dimethylformamide at 80° C to obtain a spinning dope of 18% concentration. With its temperature being maintained at 70° C, the dope was extruded in a 60% aqueous solution of dimethylformamide at 40° C through a spinning nozzle having 0.08 mm diameter orifices. The thus coagulated filaments were drawn to 6.3 times their initial length in a water bath at 98° C and thoroughly washed in a 50° water bath. The fiber was then treated with an oily preparation and taken up. After being allowed to stand at room temperature, the dried fiber was heat-treated in relaxed condition in water vapor at 105° C. The resulting fiber had a fineness of 2.5 d, a tenacity of 2.6 g/d and an elongation of 48%. It was excellent in resistance to hot water and heat, giving a shrinkage of 0.3% in boiling water and a shrinkage of 3% in air at 180° C.

EXAMPLE 4

Two-hundred ml of acrylonitrile, 36 g sodium allylsulfonate, 5 g methyl acrylate, 200 ml ligroin and 100 ml n-butanol were thoroughly blended, followed by the addition of 500 ml water. The mixture was shaken and admixed well. The system was then irradiated with gamma rays at a dose rate of 8.3 × 10³ γ/hr at 25° C for 6 hours, whereby acrylonitrile was radiation-polymerized. After the irradiation, the system was poured in methanol, and the polymer was recovered and dried under reduced pressure. The yield of the polymer was 73 g. Separately, a system comprising 98.5 g of poly(vinyl chloride) polymer (same as the one used in Example 1), 80 ml acrylonitrile, 160 ml ligroin, 50 ml n-butanol and 500 ml water was irradiated in the same manner as Example 1 to obtain a vinyl chloride resin matrix-polymerized with acrylonitrile. The rate of polymerization of acrylonitrile was 71% and the matrix-polymerized acrylonitrile content was 39.6%.

One hundred parts of this matrix-polymerized resin was blended with 25 parts of the acrylonitrile polymer obtained by the radiation polymerization previously described, and the resulting resin mixture was gradually added and dissolved in dimethylformamide at 80° C under stirring to obtain a spinning dope of 19% concentration. This spinning dope was extruded and the resulting filaments were drawn and heat-treated, under the same conditions as in Example 1. The fiber had a dry tenacity of 2.8 g/d, a dry elongation of 38% and a Young's modulus of 45 g/d. It was excellent in thermal stability, giving a shrinkage of 0.5% in boiling water and a shrinkage of 3% in air at 200° C.

This fiber was dyed at 98° C using 2% per unit weight of fiber of Basacryl Blue 214 (commercial cationic dye). The exhaustion of the dyeing bath was almost 100% and the fiber was dyed deep, brilliant and attractive. The desorption of the dye on laundering was 0.8%, substantiating the excellent wash fastness of the dyed fiber. The fastness of the dyed fiber to sunlight, as measured with a fadometer, corresponded to Grade 5.

REFERENCE EXAMPLE 3

Poly(vinyl chloride) powder (the same one as employed in Example 1) and acrylonitrile polymer (the same one as employed in Example 4) were mixed in the proportion of 48 : 52. The mixture was dissolved in dimethylformamide at 70° C to prepare a spinning dope of 21% concentration. This dope exhibited an appearance homogeneously dissolved, but was unstable to separate into two phases after standing overnight.

The dope sufficiently mixed up was immediately conducted with spinning, stretching and post-treatment as in Example 4. The fibers obtained were very brittle and white opaque, and showed dry tenacity of 1.6 g/d and dry elongation of 15%. When the fibers were dyed with a cationic dyestuff as in Example 4, the pick-up of the dye was the same degree as those in Example 4, but the dyeing density of the fibers was very low and showed neutral tints.

EXAMPLE 5

One hundred grams of the waste poly(vinyl chloride) fibers 50 μ in diameter which were finely chopped were soaked for 30 minutes in 1000 ml liquid mixture consisting of one part benzene, one part petroleum benzine and 1% by weight of azobisisobutyronitrile. The soaked fibers were squeezed so as to weigh 150 g to prepare poly(vinyl chloride) fibers impregnated with azobisisobutyronitrile, followed by adding the fibers to 2000 ml of 8% aqueous solution of acrylonitrile. The system was reacted at 60° C for 5 hours by passing nitrogen gas, filtered with glass filter, and dried. The resulting matrix-polymerized material showed an increase of 40 g in weight, and it was dissolved in dimethylformamide at 70° C to prepare a spinning dope of 10% concentration. The dope was cooled to 60° C and spun into an aqueous dimethylformamide solution at 40° C. The filaments obtained were stretched to 3 times length in a drawing bath having the same composition as the above spinning bath, and then washed with water and dried to obtain the fibers having practicable tenacity. The fibers retained their fiber form when heated even to 200° C without showing a remarkable shrinkage, whereas the poly(vinyl chloride) fibers employed as starting material completely lost their fiber form at a temperature lower than 200° C.

EXAMPLE 6

A separable three-necked flask of 2-liter capacity was charged with 200 ml purified acrylonitrile, 200 ml ligroin, 100 ml n-butanol as polymerization regulator and 500 ml water, and after purging with nitrogen gas for 15 minutes, the system was irradiated with gamma rays at the dose rate of $8.3 \times 10^3$ γ/hr for 6.1 hours at 25° C under vigorous stirring and in nitrogen streams. The reaction product was washed repeatedly with methanol to sufficiently remove the unreacted monomer, ligroin, n-butanol and water and separated by filtration. The product was dried at 50° C and weighed. The polymerization rate of acrylonitrile was 44%. This polymer was dissolved in dimethylformamide and the intrinsic viscosity of the solution at 25° C was measured. The intrinsic viscosity thus obtained was 2.30 dl/g, while the average degree of polymerization was 2000. Fifty-five parts of the polyacrylonitrile powder and 45 parts of poly(vinyl chloride) powder (product of suspension polymerization, the average size 120 μ. average degree of polymerization 970) were dissolved in dimethylformamide at 70° C to obtain a spinning dope of 16.8% concentration. The viscosity of the dope as measured with a B-type viscometer (manufactured by Tokyo Keiki K.K., Japan) was 210 poises. The dope was extruded through orifices, 0.08 mm in diameter, into a 37.5% aqueous solution of calcium chloride at 100° C, wherein it was coagulated. The resulting filaments were drawn to 6.65 times their original length in a water bath at 95° C and, then, washed thoroughly in a water bath at 40° C. The washed fiber was treated with an oily preparation containing a softener, antistatic agent, binder, etc. and taken up, followed by drying in a current of air at room temperature.

After being allowed to stand overnight, the dry fiber was mechanically crimped at the rate of 11 crimps/inch and relaxed in a stuffing box-type steam bath at 110° C.

The resulting fiber was found to possess the following superior heat resistance and water resistance: Fineness 3.2 d; dry tenacity 3.0 g/d; dry elongation 23%; Young's modulus 35 g/d; dry/wet tenacity ratio 95%; knot strength ratio 85%; shrinkage in boiling water 0.7%; thermal shrinkage in air at 180° C 6%; and the temperature at which the dry heat shrinkage is 10%, being not lower than 230° C.

The crimped fiber was thoroughly opened and the resulting fiber mass was contacted with an open flame, whereupon the fiber become blackened and carbonized but hardly inflammed. Even when it inflammed, the flare was very mild and when the flame was moved away, the fiber spontaneously ceased to burn. In other words, the fiber was self-extinguishing. When a commercial acrylic fiber was similarly treated, it burned up in flames.

EXAMPLE 7

Two-hundred ml of acrylonitrile, 4g potassium p-styrenesulfonate, 20 ml methyl acrylate, 50 ml n-butanol, 200 ml ligroin and 500 ml water were thoroughly blended and the radiation polymerization was conducted by a procedure similar to that described in Example 6. After the system was irradiated with the total dose of $5.9 \times 10^5$ γ, the reaction product was purified in the same manner as in Example 6 and dried under reduced pressure. The procedure yielded 81 g polymer. This polymer was dissolved in dimethylformamide.

The intrinsic viscosity thereof at 25° C was 3.12 dl/g, and the average degree of polymerization of the polymer was 2900. Forty-three parts of this polymer and 57 parts of the same poly(vinyl chloride) resin as used in Example 6 were dissolved in dimethylacetamide at 60° C to prepare a spinning dope of 15% concentration. The dope had a viscosity of 185 poises and, even on standing for a week, remained stable, showing no sign of phasic separation. The spinning dope was extruded and the resulting filaments were drawn, crimped and heat-treated in the same manner as in Example 6. The fiber had the following properties: Fineness 3.00; dry tenacity 2.8 g/d; dry elongation 28%; Young's modulus 31 g/d; shrinkage in boiling water 0.5%; thermal shrinkage in air at 180° C, 7%.

This fiber was dyed with a cationic dyestuff at 98° C for 2 hours at the bath ratio of 50 : 1 and dye concentration of 2% by weight. The result is set forth in the following Table 3.

Table 3

|  | Fiber of this invention | Poly(vinyl chloride) fiber |
| --- | --- | --- |
| Dye exhaustion | 19.8 mg/g | 5.9 mg/g |
| K/S | 14.2 | 10.1 |
| Dye desorption by laundering | 7.2% | 11% |
| Light fastness | Grade 5 | Grade 5 |
| Dye: Basacryl Blue 214 (Bayer) | | |

The fiber of this invention could be dyed deep, brilliant and attractive. In contrast, the conventional poly(vinyl chloride) fiber was no more than stained and showed an appreciable shrinkage during the dyeing process.

REFERENCE EXAMPLE 4

The same spinning dope as used in Example 6 was extruded in a 50% aqueous solution of dimethylformamide at 40° C. The resulting fiber could not be drawn and was opaque and brittle.

REFERENCE EXAMPLE 5

The same spinning dope as used in Example 7 was extruded in a 50% aqueous solution of dimethylformamide at 40° C and the resulting filaments were drawn to 6.75 times their original length in a water bath at 95° C. The fiber was then washed with water, taken up and dried. The resulting fiber had a dry tenacity of no more than 1.6 g/d and a dry elongation of no more than 8%, being a very weak fiber. This filament was stretched until it was broken and the appearance of the broken part was observed. It was found that the fiber and been broken into fine hairy fibrils.

What is claimed is:

1. A process for preparing synthetic fibers comprising polymerizing by means of an ionizing radiation acrylonitrile or a mixture of acrylonitrile and a monomer or monomers copolymerizable with acrylonitrile wherein acrylonitrile is present as the major component in a solid vinyl chloride resin matrix in the presence of a mixture of a liquid hydrocarbon having a small swelling and solvent function selected from the group consisting of ligroin and petroleum benzine and water, each of which substantially acts as a medium for polymerization, so as to provide a polymer blend of the solid vinyl chloride resin matrix and an acrylonitrile polymer matrix-polymerized therein, the total amount of the matrix-polymerized acrylonitrile component being at least about 23% by weight based on the total amount of said polymer blend, dissolving the polymer blend thus obtained in a solvent to prepare a spinning dope and spinning said dope to form a fiber.

2. The process as set forth in claim 1, in which said copolymerizable monomer is selected from the group consisting of styrene sulfonic acid, allyl sulfonic acid and salts thereof, acrylic acid, methacrylic acid, itaconic acid and salts thereof, vinyl pyridine, styrene, methyl acrylate, methyl methacrylate and vinyl acetate.

3. The process as set forth in claim 1, in which said vinyl chloride resin is selected from the group consisting of poly(vinyl chloride) and copolymers of vinyl chloride present in an amount greater than 50% by weight and at least one vinyl monomer selected from the group consisting of a vinyl ester, a vinyl ether, vinylidene chloride and acrylonitrile.

4. A process for preparing synthetic fibers comprising polymerizing by means of an ionizing radiation acrylonitrile or a mixture of acrylonitrile and a monomer or monomers copolymerizable with acrylonitrile wherein acrylonitrile is present as the major component in a solid vinyl chloride resin matrix in the presence of a mixture of a liquid hydrocarbon having a small swelling and solvent function selected from the group consisting of ligroin and petroleum benzine and water, each of which substantially acts as a medium for polymerization, so as to provide a polymer blend of the solid vinyl chloride resin matrix and an acrylonitrile polymer matrix-polymerized acrylonitrile component being at least about 23% by weight based on the total amount of said polymer blend, adding a vinyl chloride resin from an external source to said polymer blend on or before preparing a spinning dope by dissolving said polymer blend in a solvent, under the limitation that the matrix-polymerized acrylonitrile component should be within the range of from about 23% by weight based on the total amount of the mixture comprising said polymer blend and the added resin, and spinning said dope to form a fiber.

5. A process for preparing synthetic fibers comprising polymerizing by means of an ionizing radiation acrylonitrile or a mixture of acrylonitrile and a monomer or monomers copolymerizable with acrylonitrile wherein acrylonitrile is present as the major component in a solid vinyl chloride resin matrix in the presence of a mixture of a liquid hydrocarbon having a small swelling and solvent function selected from the group consisting of ligroin and petroleum benzine and water, each of which substantially acts as a medium for polymerization, so as to provide a ploymer blend of the solid vinyl chloride resin matrix and an acrylonitrile polymer matrix-polymerized therein, the total amount of the matrix-polymerized acrylonitrile component being at least about 23% by weight based on the total amount of said polymer blend, adding an acrylonitrile resin from an external source to said polymer blend on or before preparing a spinning dope by dissolving said polymer blend in a solvent, under the limitation that the matrix-polymerized acrylonitrile component should be within the range of from about 23% by weight to about 70% by weight based on the total amount of the mixture comprising said polymer blend and the added resin in addition to the limitation that the amount of the acrylonitrile to be added should not exceed three times the weight of the matrix-polymerized acrylonitrile component originally present in said polymer blend, and spinning said dope to form a fiber.

6. The process as set forth in claim 1, in which the matrix-polymerization is carried out in the presence of a chain transfer agent.

* * * * *